Aug. 1, 1933.  J. DE CHAMERLAT  1,920,681
CONDENSING APPARATUS
Filed March 13, 1931
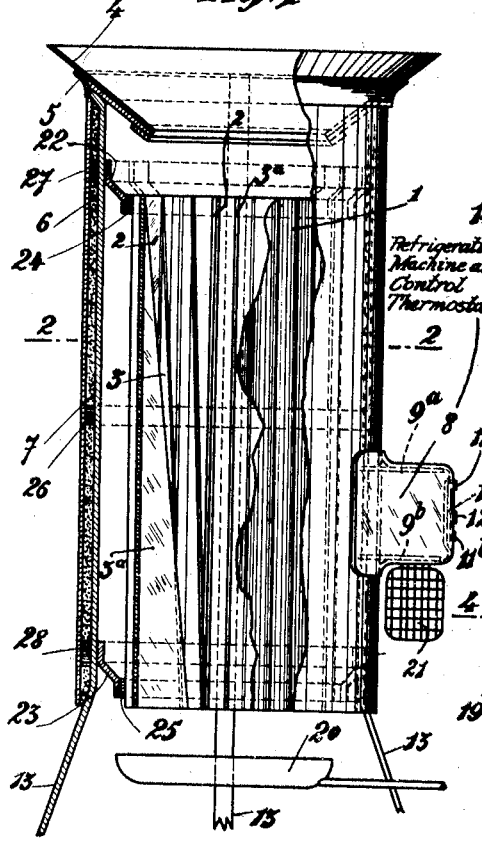
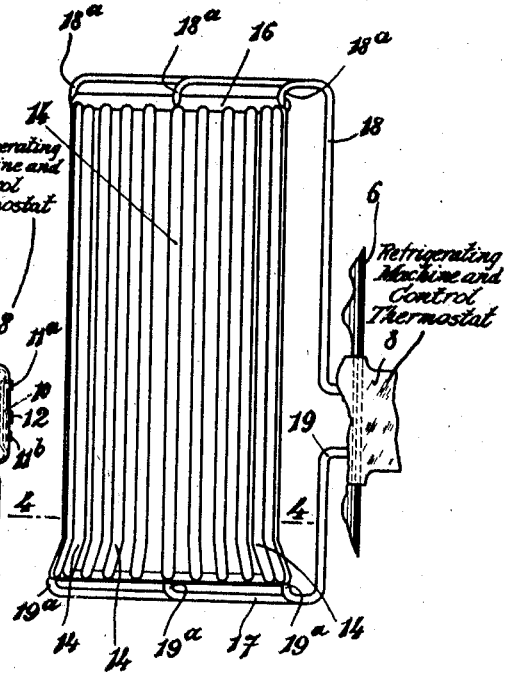
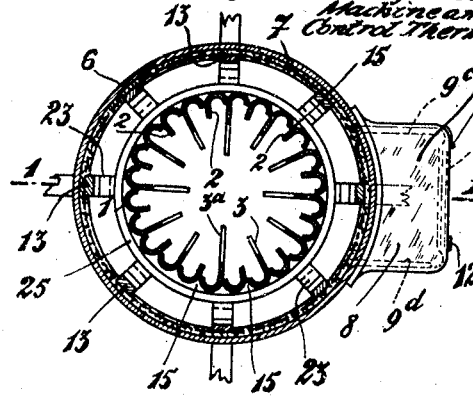
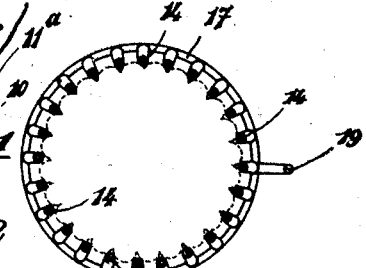
Inventor:
J. de Chamerlat Patented Aug. 1, 1933

1,920,681

UNITED STATES PATENT OFFICE 1,920,681

CONDENSING APPARATUS

Jean de Chamerlat, Trelissac, France

Application March 13, 1931, Serial No. 522,383, and in France January 21, 1931

10 Claims. (Cl. 62—140)

The present invention has for its object an apparatus for collecting, by condensation, the humidity of the atmosphere.

This apparatus consists essentially of a grooved cylinder, provided with fins, so as to present a great surface, which cylinder is cooled by contact with a nest of tubes which acts as an evaporator to a refrigerating machine; the drop of temperature which occurs during the working of this machine causes the condensation of humidity on the whole surface of the cylinder, and the water thus obtained is evacuated in a suitable manner.

In one embodiment, the apparatus is mounted in an insulating jacket provided at its upper end with a hopper and the condensate is collected at the bottom of the jacket.

A thermostat or similar apparatus, is added to the engine of the refrigerating machine and is placed, together with the latter, in a box fixed to the jacket; it only allows the engine to act when the temperature of the cylinder rises and tends to differ too much from the temperature of condensation, or dew point.

A preferred embodiment of my invention will be hereinafter described with reference to the appended drawing, given merely by way of example, and in which:

Fig. 1 shows the apparatus partly in elevation and partly in vertical section on the line 1—1 of Fig. 2, the nest of tubes being removed;

Fig. 2 is a horizontal section on the line 2—2 of Fig. 1;

Fig. 3 is an elevational view of the nest of tubes which surrounds the grooved cylinder;

Fig. 4 is a section on the line 4—4 of Fig. 3.

The apparatus shown in the drawing comprises a vertical metallic, grooved cylinder 1, made of tinned copper, aluminium, nickel, alloys or any other material, inwardly provided along generatrices with fins, alternately rectangular 2 or triangular 3 and $3^a$. Merely by way of example, this cylinder will be made of suitably cut out and bent iron sheets, welded together, as it may be seen from the appended drawings, but any other way of manufacture might be considered.

Over cylinder 1 is provided a hopper 4, in the shape of a truncated cone. Said cylinder 1 is surrounded outwardly by an insulating jacket consisting of an outer wall 6 made of fibro-cement, for example, and of an inner wall 7, which is thicker, made of cork, or any other suitable material. This double jacket leaves around the grooved cylinder an annular space, through which air may circulate freely. For this purpose, cylinder 1 is provided with two rings 24 and 25, each connected by lugs 22 and 23 to the aforementioned jacket. Around hopper 4 and at the upper side of wall 6 is mounted a collar 5, forming a wrapper.

The whole of the apparatus is supported by feet 13, four of them for example. These are riveted or fixed in any other manner, to horizontal rings 26, 27 and 28 secured to the jacket. At about its lower third the apparatus is provided with a water-tight metallic box 8, lined with fibro-cement in $9^a$, $9^b$, $9^c$, $9^d$, and provided also with a tight fitting door 10, having two hinges, $11^a$ and $11^b$ and a lock 12.

The grooved cylinder 1 is outwardly surrounded by a nest of metallic tubes 14, of small section, made of tinned copper, or any other material. Preferably these tubes are welded to the bottom of each groove 15. They are connected at their upper and lower ends through two circular headers 16 and 17, made of the same material as the vertical tubes, the upper header 16 being preferably of greater section.

The upper tube 16 is connected by a pipe 18 comprising a certain number of branches $18^a$, to the compressor of a compression refrigerating machine of any ordinary type, using sulfur dioxide $SO_2$ or methyl chloride $CH_3Cl$. This machine which is of any known type is located, together with its electric motor and a part of the thermostat, in box 8, and its condenser, fixed outside and underneath said box is shown diagrammatically in 21. The nest of tubes 14 plays, for said machine, the part of evaporator.

The under header 17 is connected through pipe 19, comprising a certain number of branches $19^a$, to the regulating valve of the refrigerating machine.

The working of the refrigerating machine, started, for example, by means of an electric motor causes the cooling of tubes 14; the fall of temperature is transmitted to the walls of the grooved cylinder and to its fins.

As soon as the temperature of these pieces falls below the point of condensation in the air or dew point, the humidity of the atmosphere is condensed on all the walls of the fins of the cylinder, and runs towards the bottom where it is collected in a collector diagrammatically shown in 20.

A regulator or dilation thermostat, cuts off the current which starts the electric motor as soon as the temperature falls below the given point, and turns it on again as soon as it rises above said point.

The temperature corresponding to the stopping or starting of the motor is generally fixed at a few degrees below the point of condensation or dew point, and the thermostat is consequently regulated to it.

The working of the motor being thus intermittent and not continuous, the working of the machine is very economical.

While I have disclosed what I deem to be the preferred form of my device I do not wish to be limited thereto as there might be changes made in the construction, disposition and form of the parts without departing from the spirit of my invention as comprehended within the scope of the appended claims.

What I claim is:

1. A condensing apparatus for use with a refrigerating machine, for collecting the humidity of the atmosphere, comprising in combination, a cylinder provided with longitudinal grooves, a nest of longitudinal tubes acting as an evaporator for said machine and disposed in contact with said cylinder, and means for collecting the water formed on the walls of said cylinder.

2. A condensing apparatus for use with a refrigerating machine, for collecting the humidity of the atmosphere, comprising in combination, a cylinder provided with longitudinal grooves, inwardly extending longitudinal fins on said cylinder, a nest of longitudinal tubes acting as an evaporator for said machine and disposed in contact with said cylinder, and means for collecting the water formed on the walls of said cylinder.

3. A condensing apparatus for use with a refrigerating machine, for collecting the humidity of the atmosphere, comprising in combination, a cylinder provided with longitudinal grooves, inwardly extending longitudinal fins on said cylinder, an insulating jacket surrounding said cylinder, a nest of longitudinal tubes acting as an evaporator for said machine and disposed in contact with said cylinder, and means for collecting the water formed on the walls of said cylinder.

4. A condensing apparatus for use with a refrigerating machine, for collecting the humidity of the atmosphere, which comprises in combination, a cylinder provided with longitudinal grooves, a plurality of inwardly extending fins on the inner face of said cylinder, a nest of longitudinal tubes in contact with the outer face of said cylinder, said tubes acting as an evaporator for said machine and being so connected therewith that the refrigerating liquid therefrom is caused to flow upwardly through said tubes, and means, at the bottom of the apparatus, for collecting the water formed on the walls of said cylinder.

5. A condensing apparatus for use with a refrigerating machine, for collecting the humidity of the atmosphere, which comprises in combination, a cylinder provided with longitudinal grooves, a plurality of inwardly extending fins on the inner face of said cylinder, a nest of longitudinal tubes in contact with the outer face of said cylinder, said nest of tubes acting as an evaporator for said machine and being so connected therewith that the refrigerating liquid therefrom is caused to flow in an upward direction through said tubes, a heat insulating jacket surrounding said cylinder, and means, at the bottom of the apparatus, for collecting the water formed on the walls of said cylinder.

6. A condensing apparatus for use with a refrigerating machine, for collecting the humidity of the atmosphere, which comprises in combination, a cylinder provided with longitudinal grooves in its outer face, a plurality of inwardly extending fins on the inner face of said cylinder, a nest of longitudinal tubes inserted in said longitudinal grooves, said nest of tubes acting as an evaporator for said machine and being so connected therewith that the refrigerating liquid therefrom is caused to flow in an upward direction through said tubes, a heat insulating jacket surrounding said cylinder at a certain distance therefrom so that air may circulate between said jacket and said cylinder, and means, at the bottom of the apparatus, for collecting the water that is formed on the walls of said cylinder.

7. A condensing apparatus for use with a refrigerating machine, for collecting the humidity of the atmosphere, which comprises in combination, a cylinder consisting of a plurality of elongated metal sheets folded transversally so as to have a substantially U-shaped cross section and rigidly assembled together so that the outer surface of the cylinder thus formed consists of a series of juxtaposed longitudinal elements of convex cross section, while the inner surface of said cylinder consists of a plurality of corresponding concave elements the edges of which form fins extending inwardly inside said cylinder, a nest of longitudinal tubes inserted in the grooves existing on the outer surface of said cylinder, said nest of tubes acting as an evaporator for said refrigerating machine and being so connected therewith that the refrigerating liquid therefrom is caused to flow in an upward direction through said tubes, a heat insulating jacket surrounding said cylinder at a certain distance therefrom so that air can circulate between said jacket and said cylinder, and means, at the bottom of the apparatus, for collecting the water that is formed on the walls of said cylinder.

8. A condensing apparatus according to claim 4 in which said fins are of a substantially triangular form so as to be of increasing width from the top to the bottom.

9. A condensing apparatus according to claim 6 in which said fins are of a substantially triangular form so as to be of increasing width from the top to the bottom.

10. A condensing apparatus according to claim 7 in which said fins are of a substantially triangular form so as to be of increasing radial width from the top to the bottom.

JEAN DE CHAMERLAT.